(12) United States Patent
Thazhmon et al.

(10) Patent No.: US 8,930,473 B2
(45) Date of Patent: Jan. 6, 2015

(54) APPLICATION PLATFORM FOR ELECTRONIC MAIL

(75) Inventors: Sudeep Mathew Thazhmon, Winter Garden, FL (US); Lance Jackson, Lake Mary, FL (US)

(73) Assignee: Powerinbox, Inc, Cambridge, MA (US)

( * ) Notice: Subject to any disclaimer, the term of this patent is extended or adjusted under 35 U.S.C. 154(b) by 11 days.

(21) Appl. No.: 13/400,156

(22) Filed: Feb. 20, 2012

(65) Prior Publication Data

US 2013/0218985 A1    Aug. 22, 2013

(51) Int. Cl.
*G06F 15/16* (2006.01)
(52) U.S. Cl.
USPC ............................ 709/206; 709/204; 709/205
(58) Field of Classification Search
USPC .......................................... 709/204, 205, 206
See application file for complete search history.

(56) References Cited

U.S. PATENT DOCUMENTS

| | | | |
|---|---|---|---|
| 6,223,213 B1 * | 4/2001 | Cleron et al. | 709/206 |
| 6,460,075 B2 * | 10/2002 | Krueger et al. | 709/206 |
| 2002/0194288 A1 * | 12/2002 | Krueger et al. | 709/206 |
| 2004/0128356 A1 * | 7/2004 | Bernstein et al. | 709/206 |
| 2006/0101119 A1 * | 5/2006 | Qureshi et al. | 709/206 |
| 2007/0266093 A1 * | 11/2007 | Forstall et al. | 709/204 |
| 2007/0271344 A1 * | 11/2007 | Danasekaran et al. | 709/206 |
| 2011/0196933 A1 * | 8/2011 | Jackson et al. | 709/206 |
| 2012/0254321 A1 * | 10/2012 | Lindsay et al. | 709/206 |
| 2012/0303429 A1 * | 11/2012 | Nolledo et al. | 705/14.16 |
| 2013/0124650 A1 * | 5/2013 | Bernstein et al. | 709/206 |

* cited by examiner

*Primary Examiner* — Edward Kim
(74) *Attorney, Agent, or Firm* — Pearl Cohen Zedek Latzer Baratz; Mark Cohen (57) ABSTRACT

Methods and apparatus, including computer program products, for an application platform for electronic mail. A method includes, in a network of interconnected computers, receiving a request in an email server to start up an email client, initializing an app platform client residing in the email client, receiving a request in the email server to open an email message, determining if there is an app associated with the email message, and rendering the app within the email message.

23 Claims, 14 Drawing Sheets

Email Embed Code
Tutorial
Developer's Guide

SMAK by SMAK

Use PowerInbox with this SMAK Alert! | PowerInbox

Install Reason
Use PowerInbox with this SMAK Alert!

Embed Parameters for [My View ▾]

☐ subject [          ]

Email Embed Code

```
<div><br/><a href="http://plugin.powerinbox.com/install?app=SMAK" title="powerinbox-app=TjbkDZEJzNmEZk8GB0+WAJEvO8fX3aqPZij7q115Hs7Lpk65R+q7Dh83Q5yywL+RKqXWG+3fVsr58rmJK6a798kOnecNC1dL5Ayhn21Khi3rkMjg60x6eRXA9DsfvC7u7nmz4iHEl4ZaUOoxKjMbtm50QveB3sa6To/17CIAjls="; {"ID": "SMAK": "View": "myView"}"><img src="http://powerinbox.com/tracking/email/SMAK" height="1" width="1" style="border:0;display:none;"/></a><table cellspacing="0" border="0"><tr><td style="padding: 5px 8px;width:373px;background:#F7F7F7;border-top:1px solid #F2F2F2; border-bottom:2px solid #EBEBEB;border-left:1px solid #F2F2F2;border-right:1px solid #F2F2F2;" bgcolor="#F7F7F7" align="center"><table cellspacing="0" border="0"><tr><td><table cellspacing="0" border="0"><tr><td style="margin:0;padding:0;text-align:center;align:center;width:373px;" align="center"><a href="http://powerinbox.com/landing/email/SMAK" target="_blank" style="text-decoration: none;"><span style="margin:0;cursor:pointer;font-family:Arial,sans-serif;font-size:13px;font-weight:bold;color:#484848;color:#484848!important;text-shadow:0 1px 0 #ffffff;" color="#484848">Use PowerInbox with this SMAK Alert!</span><span style="font-size:15px;font-weight:normal;color:#ccc;">  |  </span><span style="margin:0;cursor:pointer;font-family:Arial,sans-serif;font-size:13px;font-weight:bold;color:#2b64d9">PowerInbox</span></a></td></tr></table><br/><div>
</td></tr></table></td></tr></table>
```

[Update] [Test Email] [Test API] [Back]

APPLICATION PLATFORM FOR ELECTRONIC MAIL

BACKGROUND OF THE INVENTION

The invention generally relates to networks and network applications, and more specifically to an application platform for electronic mail (email).

In general, email is an exchange of computer-stored messages by telecommunication. email messages are usually encoded in American Standard Code for Information Interchange (ASCII) text. However, one can also send non-text files, such as graphic images and sound files, as attachments sent in binary streams. email can also be exchanged between online service provider users and in networks other than the Internet, both public and private.

Email can be distributed to lists of people as well as to individuals. A shared distribution list can be managed by using an email reflector. Some mailing lists enable a user to subscribe by sending a request to a mailing list administrator. A mailing list that is administered automatically is called a list server.

Email is one of the protocols included with the Transport Control Protocol/Internet Protocol (TCP/IP) suite of protocols. A popular protocol for sending email is Simple Mail Transfer Protocol (SMTP) and a popular protocol for receiving it is Post Office Protocol 3 (POP3).

In general, an email message includes three components, a message envelope, a message header, and a message body. The message header contains control information, including, minimally, an originator's email address and one or more recipient addresses. Usually descriptive information is also added, such as a subject header field and a message submission date/time stamp.

A conventional email system operates using a mail user client which is a software application program used to send and receive emails. Examples include Outlook® messaging and collaboration client and Hotmail® web-based email service by Microsoft Corporation, Redmond, Wash. Conventional mail user client do not allow significant interactivity with web servers over the World Wide Web. While it is common to embed Universal Resource Locator (URL) addresses within an email, once a URL is selected, the user is taken from the mail user client, and the user accesses the selected web server URL via the user's browser. Further interaction with the selected URL is then performed by the browser, outside of the mail user client.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for an application platform for electronic mail (email).

In general, in one aspect, the invention features a method including, in a network of interconnected computers, receiving a request in an email server to start up an email client, initializing an app platform client residing in the email client, receiving a request in the email server to open an email message, determining if there is an app associated with the email message, and rendering the app within the email message.

In another aspect, the invention features a system including a processor, a memory, the memory comprising an operating system and an application process, the application process including receiving a request in an email server to start up an email client, initializing an app platform client residing in the email client, receiving a request in the email server to open an email message, determining if there is an app associated with the email message, and rendering the app within the email message.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Figure 1:
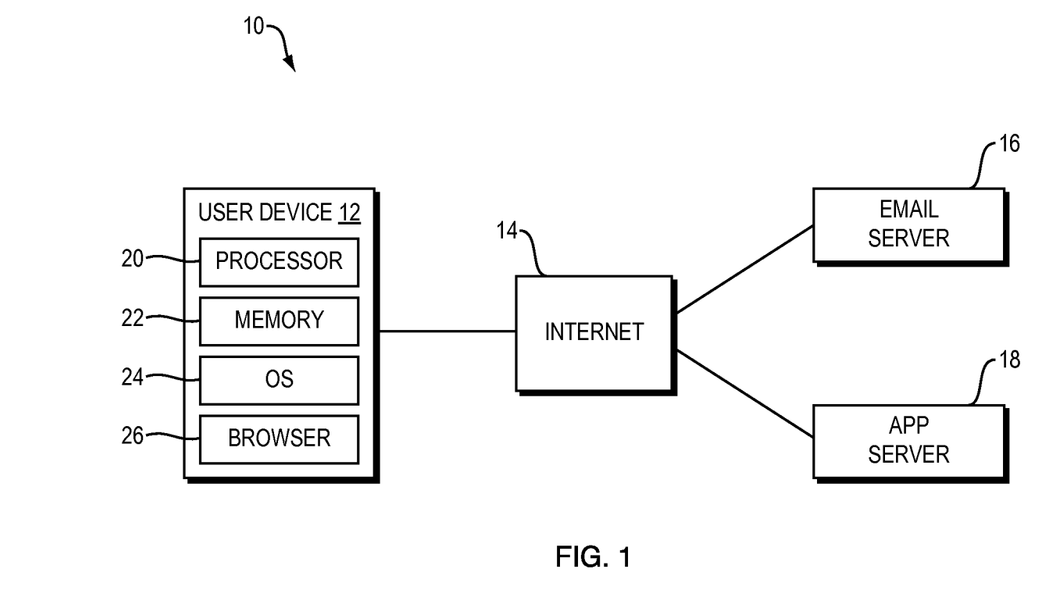
FIG. 1 is a block diagram of an exemplary network.

As shown in FIG. 1, an exemplary network 10 includes a user computing device 12 linked to a network of interconnected computers 14 (e.g., Internet). Although the user computing device 12 is shown to be linked to the Internet 14 as a wired communication connection, other linking mechanisms can employed, such as wireless communication connections. The exemplary network 10 also includes as email server 16 and an application platform server 18.

Example user computing devices 12 include a desktop personal computer (PC), a laptop computer, a netbook computer, a smartphone, a personal data assistant, a tablet PC, a smart TV, and so forth. The user computing device 12 includes a processor 20 and a memory 22. The memory 22 includes an operating system (OS) 24, such as Linux® or Android®, and a browser process 26. In general, the browser process 26 is software that accesses and displays pages and files on the world wide web (WWW). Example browsers include Mozilla Firefox®, Microsoft Internet Explorer®, and Apple Safari®.

Figure 2:
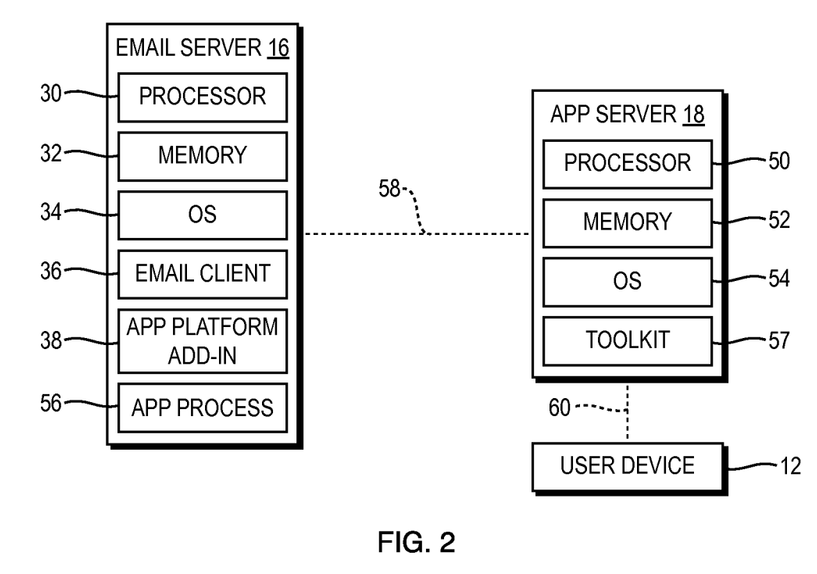
FIG. 2 is a block diagram.

As shown in FIG. 2, the email server 16 includes a processor 30 and a memory 32. The memory 32 includes an operating system 34, such as Linux® or Windows®, and an electronic mail (email) application (email client) 36. Example email clients 36 include Yahoo!®, Gmail®, Hotmail®, Outlook® and so forth. The browser process 26 can load the email client 36 for display on the user computing device 12. The email client 36 includes an application platform app platform client 38 that the enables applications (apps) to run within the email client 36 and is adaptable to all web-based, desktop and mobile email clients. In general, an app platform client is a software program that extends the capabilities of the email client 36 by communicating with an application process 56 residing in the application platform server 18 and the email client 36. The app platform client 38 may be implemented as an add-in, add-on, plug-in, code library, and so forth.

The application platform server 18 includes a processor 50 and a memory 52. The memory 52 includes an operating system 54, the application process 56 and an application toolkit 57. The application process 56 executes any number of apps over an application programming interface (API) 58 linked to the application platform app platform client 38. The API 58 is the set of protocols that enable email clients to query the application platform server 18 to determine if there are compatible apps for a given email. In general, the application platform server 18 serves as the central location for aggregating apps. In addition, app developers can submit their apps to the application platform server 18 over an app creation API 60, which is a the set of protocols and tools that enable app developers to create, modify and submit their apps to the application platform server 18.

The app platform client 38 resides within the email client 36 and anytime the email client 36 is opened the app platform client 38 queries the application process 56 to determine whether there are any apps to execute within the email client. If there are apps available for a particular email, each app including a base server path and a view path, a list of those apps are displayed within the email client 36. The base server path provides a location, e.g., URL, of the app and the view path provides a default placement for the app within an email. An address of an app is a combination of the base server path and the view path. The email client 36 takes the URL of the app and places it within the particular email as specified by the view path. Example apps include a Facebook® app, a Linkedin® app, a Twitter® app, a Southwest Airlines app, and so forth. Other example apps can include email marketing services and/or agencies apps. In implementations, the apps reside or are hosted on third party servers, such as a Facebook® server (not shown). In general, an originator/owner of an app, e.g., Facebook®, is responsible for hosting the app.

If an app is available, the app is displayed within the email client 36. If the app supports positional placement within the email client 36, a position of the executing app within the email client 36 may be adjusted, i.e., the user may position the app within the email client 36 to suit their preferences, e.g., top, bottom, left or right. In addition, the user may replace the app for the email client 36. The application platform app platform client 38 is flexible enough to enable many varied placements and new placements can be added at any time. For example, if the app supports maximization and minimization, a user may choose to have the app execute in a minimized view at all times. And an app may be designed to execute in a minimized view at all times as a default.

In another example, the user may want an app to be persistent and run all the time. In a specific example, the user controls whether the app is pinned to run all the time or not pinned to run only when asked by the user.

Multiple apps may run in a single email; these multiple apps may initially be displayed within the email as icons.

In summary, each app can specify one or more placements within an email message. The placements are displayed to the user and the user can switch between them. Placements can include mini, replace, inline, prepend, append, before, after, hover, horizontal, vertical, persistent, pinned, minimize. Placement triggers include both static and hover. Placements also enable multiple email apps from different sources to be rendered at the same time.

Figure 3:
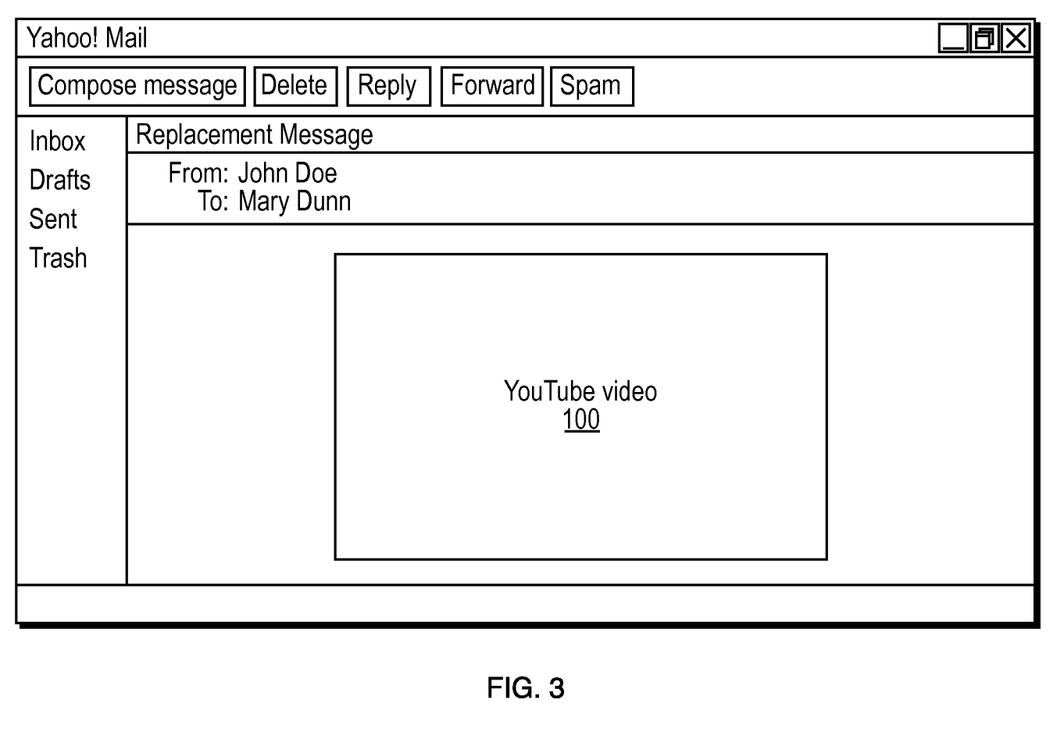
FIGS. 3-6 are exemplary app placements.

As shown in FIG. 3, an exemplary replacement 100 illustrates an app placement when an app can fully replace the content of a legacy email without any loss of information. In this example, the app is meant to replace the legacy email while providing additional dynamic interactive content. For example, the replacement placement 100 when a photo comment email from Facebook® is replaced with an app that shows the photo along with a comment that a user can reply to.

Figure 4:
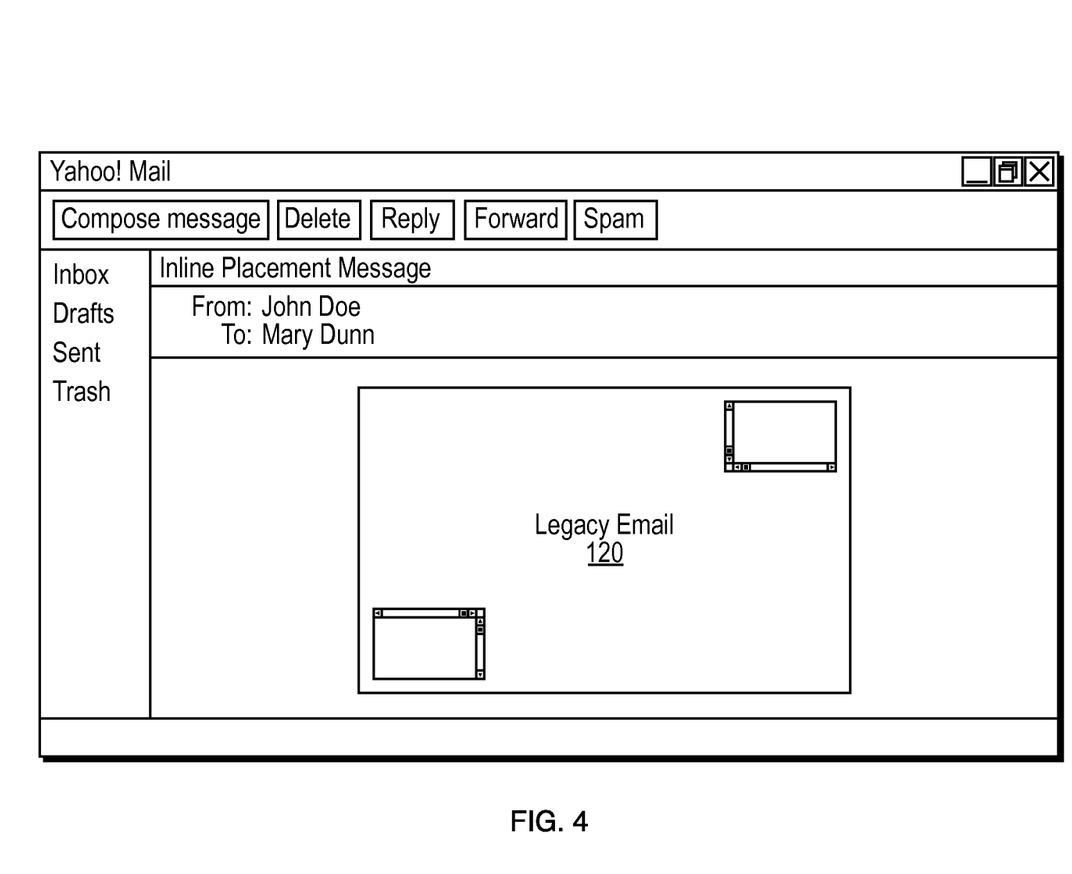

As shown in FIG. 4, an exemplary inline replacement 120 illustrates when an app is used to replace certain parts of a legacy email with dynamic interactive content. For example, this placement 120 can be used when the app is providing only a few points of interaction that fit within the content of the legacy email. For example, this placement 120 can be used when replacing a picture of a YouTube® video with the actual YouTube® video.

Figure 5:
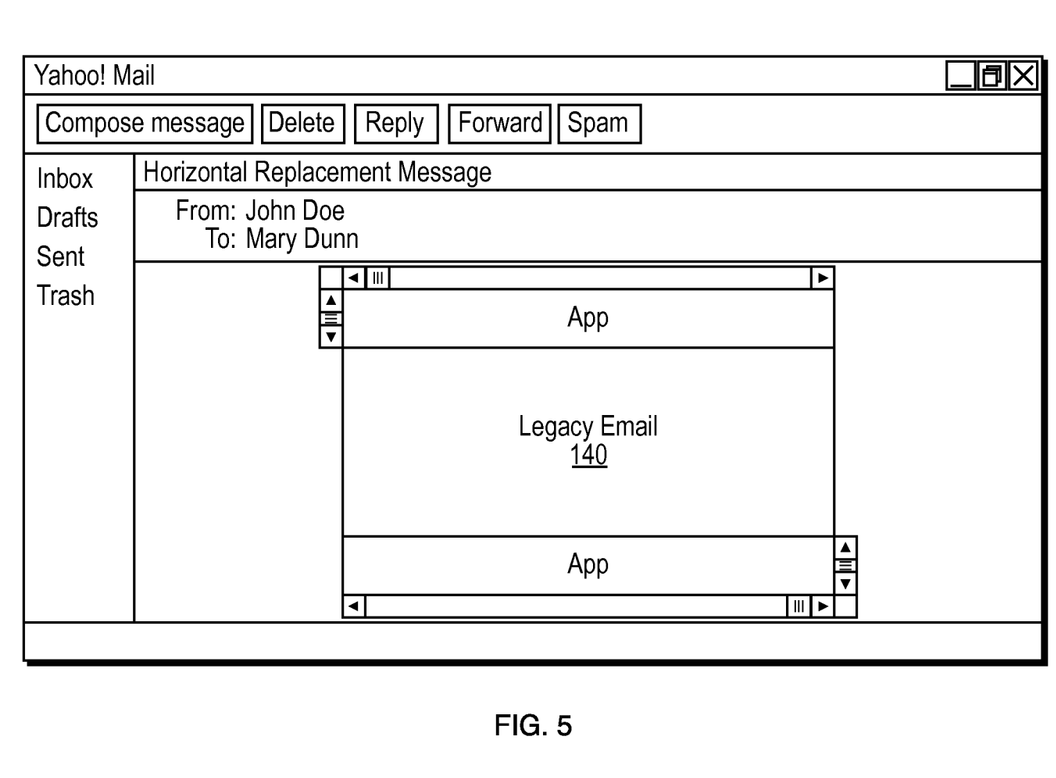

As shown in FIG. 5, an exemplary horizontal placement 140 illustrates when an app the is not replacing the content of an email, but instead is providing additional dynamic interactive content.

Figure 6:
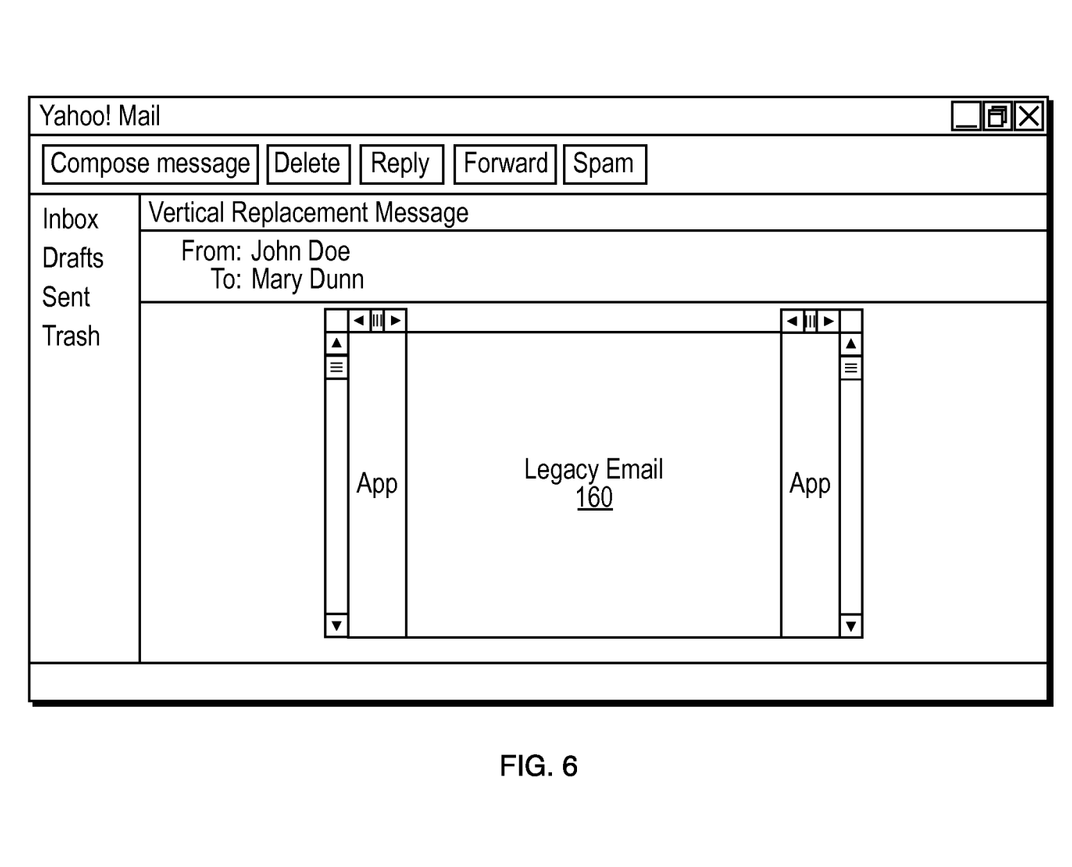

As shown in FIG. 6, an exemplary vertical placement 160 illustrates when an app is not replacing the content of an email, but instead is providing accompanying functionality.

As described above, an application toolkit (SDK) 57 and the app creation API 60 enables developers to create apps. The SDK 57 executes a series of wysiwyg interfaces to enable app creation by prompting an app developer for information. An app developer can also create an app without the SDK 57.

The following is an example of code placed inside an email to indicate a Youtube® app and its specification:

<div>
<a href="youtube.com/videoid"

title="type:inline;manipulation:replacewith;width:436px; height:321px"></a>
{Static html email body (picture of a video)}
</div>

Apps may also be created as a widgets.

Basic information for an app includes an ID, a Name, a Version, a Description, an IconURL, a LargeIconURL and a ServerURL. A main extractor includes input information, filter information and pattern information. An example first view includes an ID, path and default placement. An example placement includes a type, a width and a height.

Figure 7:
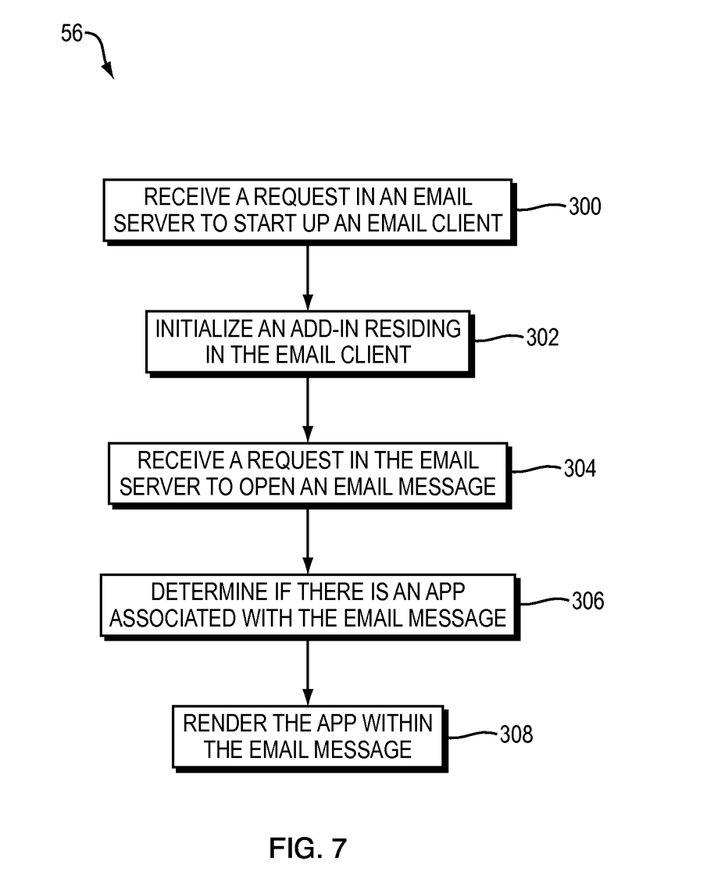
FIG. 7 is a flow diagram.

The following is an example of an app:
ID: 1234
Name: MyPowerApp
Version: 1.0.0
Description: My first Power App
IconURL: https://setup.powerinbox.com/static/icons/welcome.png
LargeIconURL: https://setup.powerinbox.com/static/icons/large/welcome.png
ServerURL: https://apps-dev.powerinbox.com/helloworld
Extractors:
Input: sender
Filter: regex
Pattern: auth@powerinbox.com
Views:
ID: PowerInboxWelcomeEmailView
DefaultPlacement: Left
Placement:
    Type: Left
    Width: 475 px
    Height: 325 px As shown in FIG. 7, the application process 56 includes receiving (300) a request in an email server to start up an email client.

Process 56 initializes (302) an app platform client residing in the email client.

Process 56 receives (304) a request in the email server to open an email message and determines (306) if there is a compatible app associated with the email message.

Process 56 renders (308) the compatible app within the email message based on properties of the app.

Determining can include looking for an app specification embedded inside the email message. Determining can include analyzing a body or header of the email message.

Rendering can include retrieving the app according to an app specification comprising view paths and associated placements and placing the app in the email message according to the app specification. An app creator may be required to submit the app for approval and available based on the permission settings for the app.

The app platform client can enable HTML4, HTML5, and its successor content, herein referred to "HTMLx," to execute inside an email.

The apps can include video, games, shopping for goods/services, sharing with their social network, music, rental goods, information retrieval, learning, surveys, event scheduling, advertisement interaction and so forth.

The app platform client further can include measuring time spent viewing an email and recording and analyzing actions performed in the email.

In implementations, the app platform client may be a generic email client.

A view can contain a placement of the app within the email message. The placement can be miniaturization, replacement, inline, horizontal, vertical, persistent, minimized, pinned and so forth.

Determining if there is an app can include searching a list of apps specifications residing in an app server.

The app can reside on a third party server in the network of interconnected computers.

The app specification can include an identification (ID), a name, a version, a description, an IconURL, a LargeIconURR, and a ServerURL, views, paths, placements, manipulations, heights and widths, selectors wrappers, extractors outputs, parameters and so forth.

An input for the extractors output can be a sender, HTML body, plain text body, subject, links, hrefs and so forth.

The selector wrappers can be specified using jquery.

The app specification can be assembled from pre-existing widgets and/or generated automatically based on parameters.

The app can include different specifications viewable by different people based on their authentication.

The app can run in different emails by having different views, be modified on static, dynamic or hover triggers in a body of the email, resize itself automatically based on the dimensions of the content changing or extract information from the email to pass as parameters to initialize itself.

The app may be turned off.

In implementations, the app specification can include a static version of the app that is displayed if the app is unavailable.

The email message can include an information button pertaining to the app platform client. The information button can be generated automatically based on parameters Determining if there is one or more app associated with the email message can include displaying a list of the one or more apps, and receiving an indications of which app to render.

One or more apps can include web content.

An inline placement of the one or more apps may altered using append, prepend, replacewith, after and/or before.

A user may insert an app while creating an email message.

Figure 8:
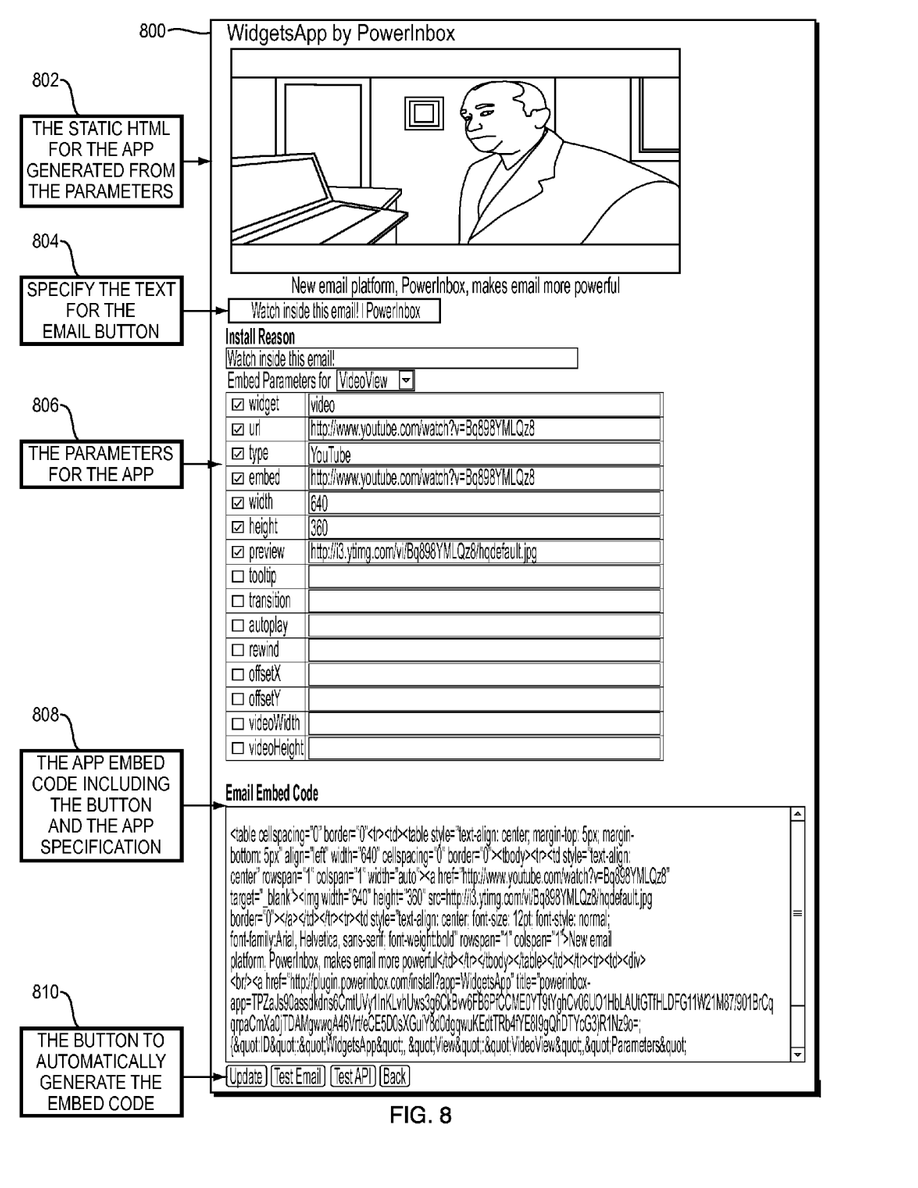
FIGS. 8-14 are exemplary user interfaces.

As shown in FIG. 8, an exemplary user interface (UI) 800 illustrates generating an app specification from parameters. The UI 800 includes static HTML for the app generated from parameters 802. The UI 800 includes a section 804 in which to specify text for an email button, the parameters for the app 806 and the app embedded code 808 including the button and app specification. The button 810 automatically generates the embedded code.

Figure 9:
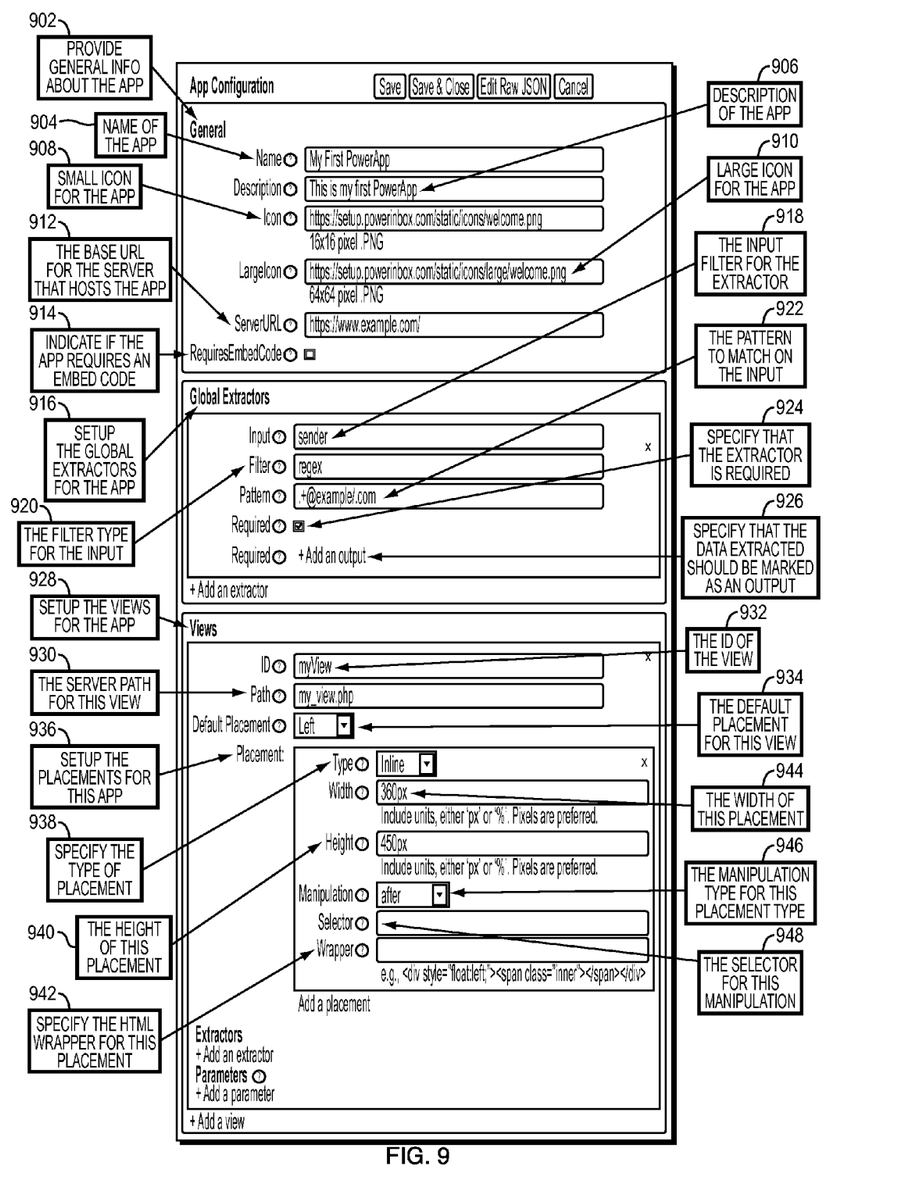

As shown in FIG. 9, an exemplary UI displaying an app specification includes a section 902 to provide general information about the app. This general information includes, for example, a name of the app 904, a description of the app 906, a small icon 908 and a large icon 910 for the app, a base URL for a server that hosts the app and an indication 914 if the app requires embedded code.

A setup for global extractors 916 includes an input filter for the extractor 918, a filter type for the input 920, a pattern to match on an input 922, and indication 924 whether an extractor is required and an indication 926 that the data extracted should be marked as output.

A setup for views 928 includes a server path for the view 930, an ID of the view 932, and a default placement for the view 934. A setup for placement 936 includes type 938, height 940, HTML wrapper 942, width 944, manipulation type 946 and selector 948.

Figure 10:
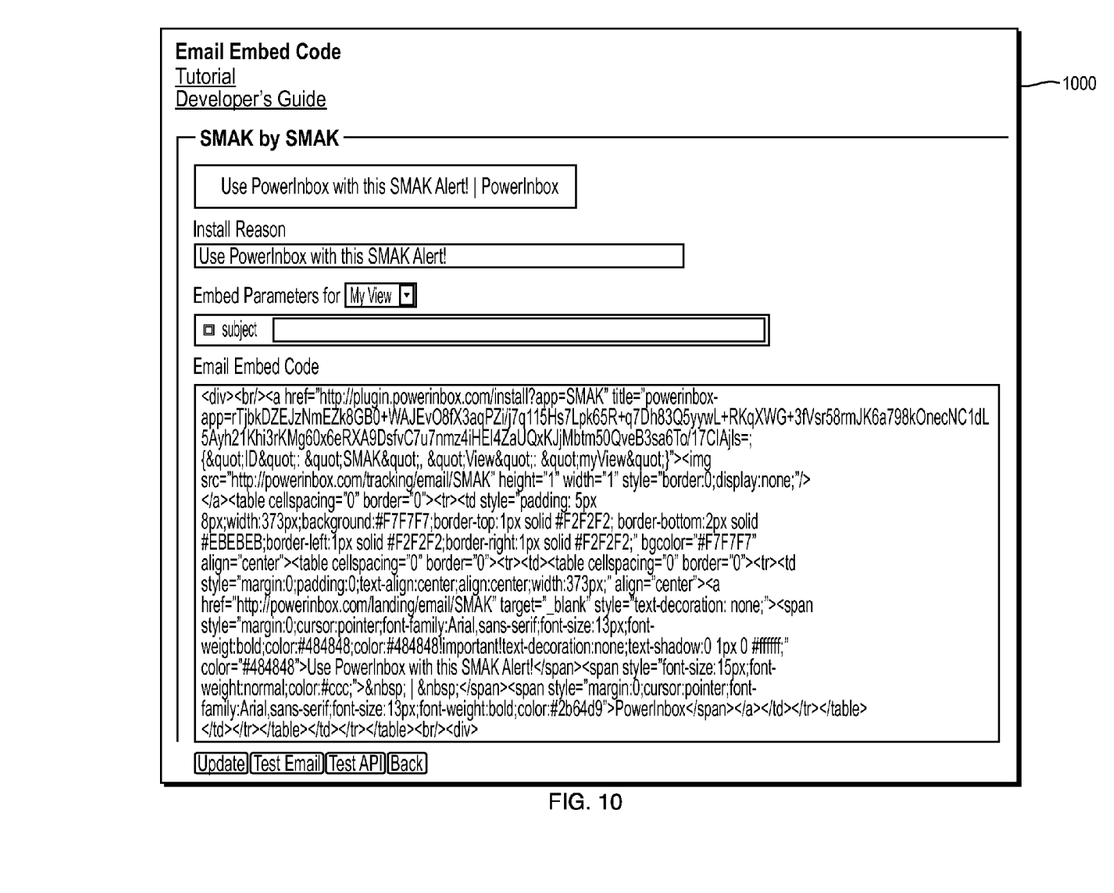

As shown in FIG. 10, a UI 1000 illustrates an email button and includes text 1002 for the email button, the embedded code 1004 for the email button and a button 1006 to generate the embedded code.

Figure 11:
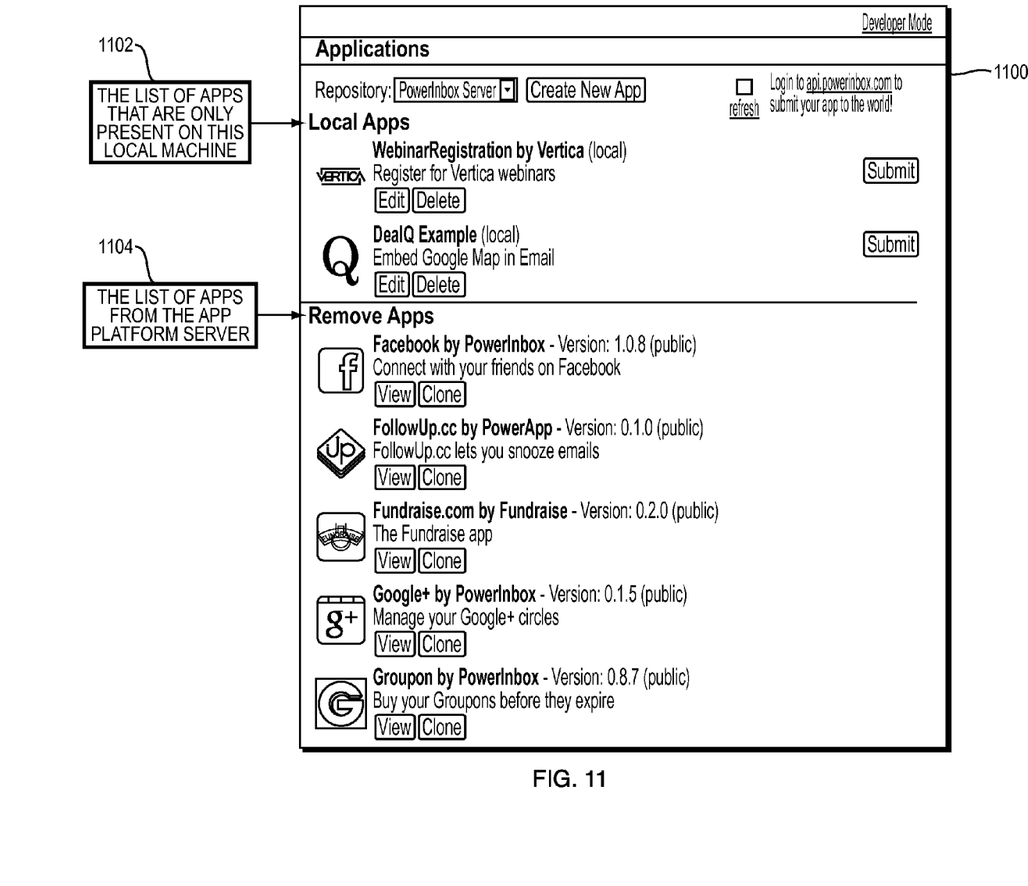

As shown in FIG. 11, an exemplary UI 1100 illustrates an exemplary display of a list of apps, including a list 1102 of apps that are only present on the local machine and a list 1104 of apps from the application server.

Figure 12:
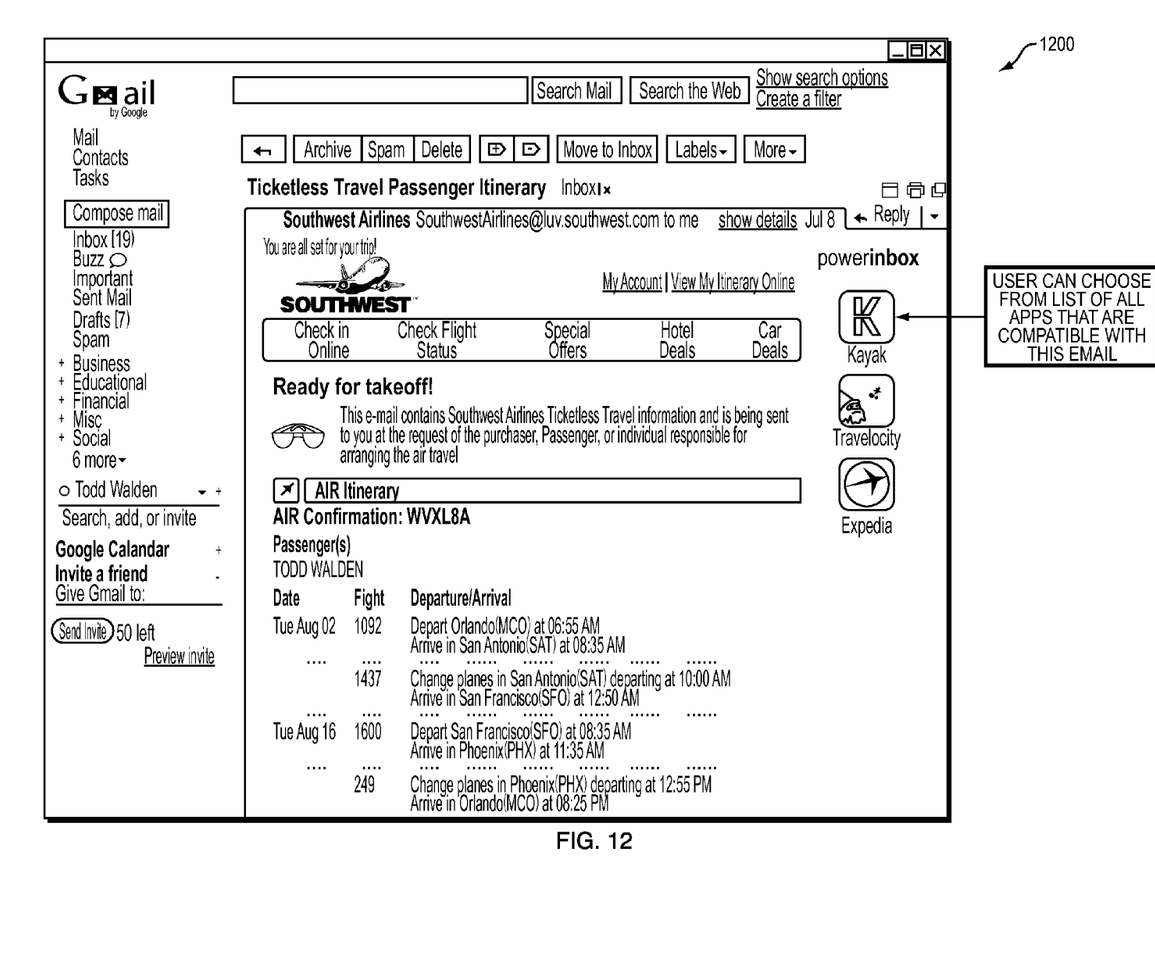

As shown in FIG. 12, an exemplary UI 1200 illustrates multiple apps running within a Gmail® email message.

Figure 13:
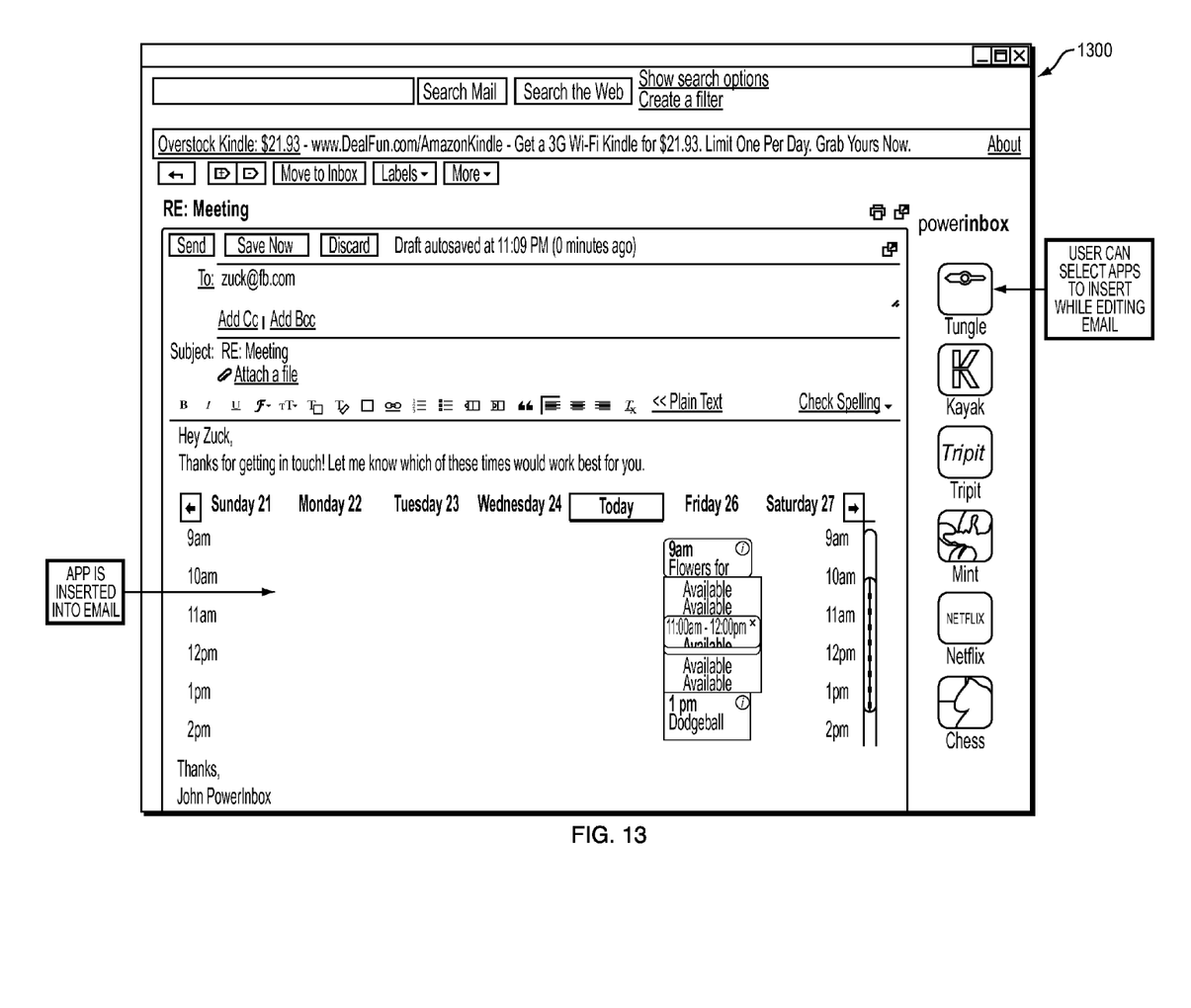

As shown in FIG. 13, an exemplary UI 1300 illustrates inserting apps while composing an email message.

Figure 14:
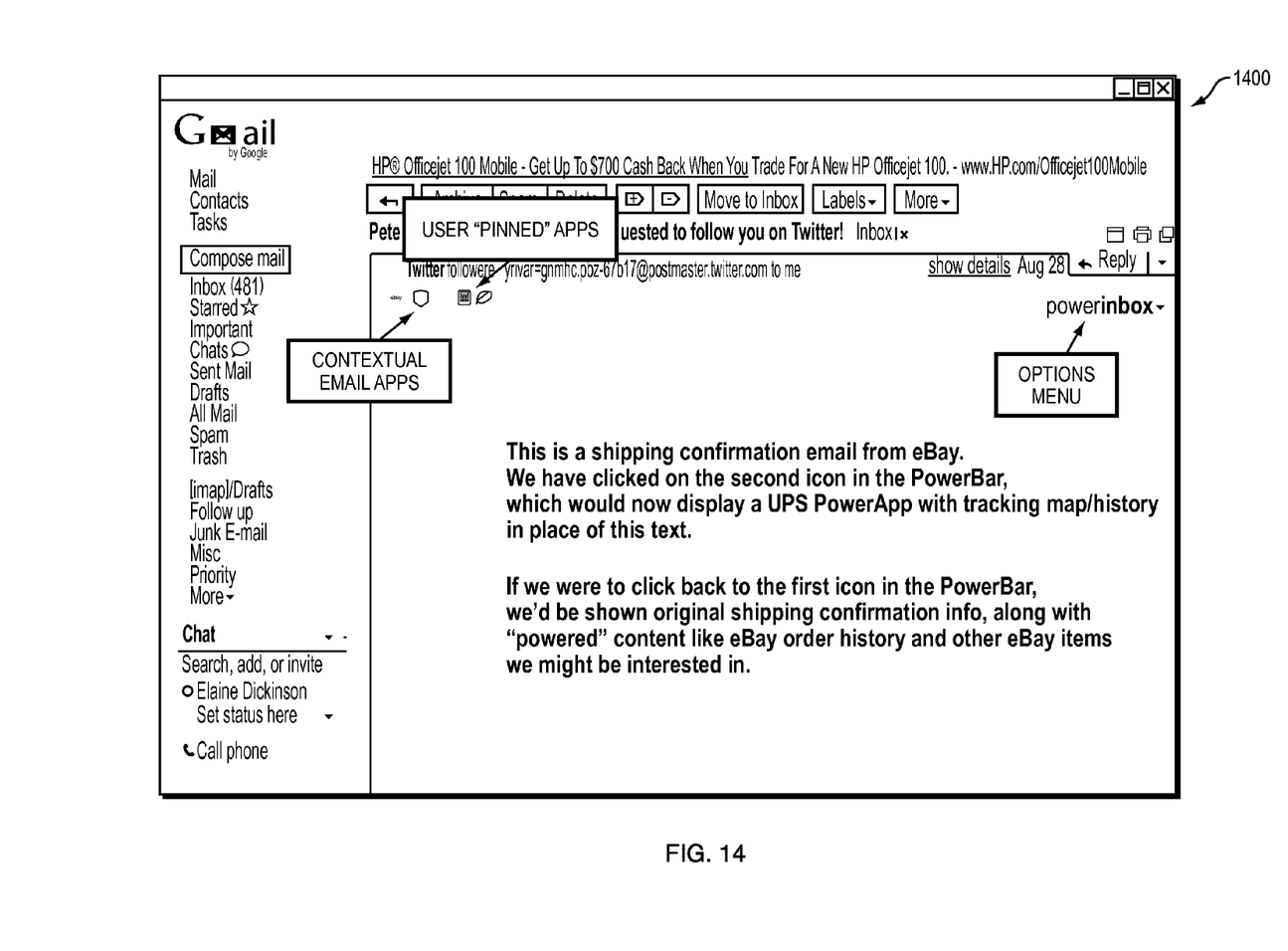

As shown in FIG. 14, an exemplary UI 1400 illustrates pinned apps within a Gmail® email message.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
   in a network of interconnected computers, receiving a request in an email server to start up an email client;
   initializing an app platform client residing in the email client;
   receiving a request in the email server to open an email message;
   determining if there is one or more app associated with the email message, wherein the determining includes at least one action selected from a group consisting of:
      searching a list of app specifications residing in an app server; and
      displaying a list of the one or more apps and receiving an indication of which app to render;
   and
   rendering the one or more apps within the email message.

2. The method of claim 1 wherein determining comprises looking for an app specification embedded inside the email message.

3. The method of claim 1 wherein determining comprises analyzing a body or header of the email message.

4. The method of claim 1 wherein rendering comprises:
   retrieving the app according to an app specification comprising view paths and associated placements; and placing the app in the email message according to the app specification.

5. The method of claim 4 wherein an app creator is required to submit the app for approval and available based on the permission settings for the app.

6. The method of claim 1 wherein the app platform client enables the apps to run within the email client.

7. The method of claim 1 wherein the app platform client enables HTMLx to run within the email client.

8. The method of claim 5 wherein the apps are selected from the group consisting of video, games, shopping for goods/services, sharing with their social network, music, rental goods, information retrieval, learning, surveys, event scheduling, and advertisement interaction.

9. A method comprising:
   in a network of interconnected computers, receiving a request in an email server to start up an email client;
   initializing an app platform client residing in the email client;
   receiving a request in the email server to open an email message;
   measuring time spent viewing an email;
   recording and analyzing actions performed in the email;
   determining if there are one or more apps associated with the email message; and
   rendering the one or more apps within the email message.

10. The method of claim 1 wherein the app platform client is a generic email client.

11. The method of claim 4 wherein a view contains a placement of the app within the email message.

12. The method of claim 11 wherein the placement is selected from the group consisting of miniaturization, replacement, inline, horizontal, vertical, persistent, minimized and pinned.

13. The method of claim 1 wherein the app resides on a third party server in the network of interconnected computers.

14. The method of claim 4 wherein the app specification comprises:
- an identification (ID);
- a name;
- a version;
- a description;
- an IconURL;
- a LargeIconURR;
- a ServerURL;
- views;
- paths;
- placements;
- manipulations;
- heights and widths;
- selectors wrappers,
- extractors outputs; and
- parameters.

15. The method of claim 14 wherein the selector wrappers are specified using jquery.

16. The method of claim 4 wherein the app specification is assembled from pre-existing widgets.

17. The method of claim 4 wherein an app specification is generated automatically based on parameters.

18. The method of claim 1 wherein the app can run in different emails by having different views, be modified on static, dynamic or hover triggers in a body of the email, resize itself automatically based on the dimensions of the content changing or extract information from the email to pass as parameters to initialize itself.

19. The method of claim 1 further comprising turning off the app.

20. The method of claim 4 wherein the app specification comprises a static version of the app that will be displayed if the app is unavailable.

21. The method of claim 1 wherein the email message comprises an information button pertaining to the app platform client, wherein the information button can be generated automatically based on parameters.

22. The method of claim 1 wherein the one or more apps comprises web content.

23. The method of claim 1 wherein a user can insert an app while creating an email message.

* * * * *